(12) United States Patent
Freimuth et al.

(10) Patent No.: US 8,139,477 B2
(45) Date of Patent: Mar. 20, 2012

(54) NETWORK ELEMENT BYPASS IN COMPUTING COMPUTER ARCHITECTURE

(75) Inventors: Douglas M. Freimuth, Hawthorne, NY (US); Charles L. Haymes, Yorktown Heights, NY (US); David P. Olshefski, Hawthorne, NY (US); John M. Tracey, Hawthorne, NY (US); Dinesh Verma, Hawthorne, NY (US); Charles P. Wright, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/508,736

(22) Filed: Jul. 24, 2009

(65) Prior Publication Data

US 2011/0019533 A1    Jan. 27, 2011

(51) Int. Cl.
*G01R 31/08* (2006.01)
(52) U.S. Cl. ......................... 370/217; 370/222
(58) Field of Classification Search .......... 370/216–220, 370/225–228, 229–230, 235, 237, 241–242, 370/244, 358, 360, 384–386, 391
See application file for complete search history.

(56) References Cited

U.S. PATENT DOCUMENTS

| | | | | |
|---|---|---|---|---|
| 4,669,113 A * | 5/1987 | Ash et al. | .................. | 379/221.01 |
| 5,697,054 A * | 12/1997 | Andersson | ..................... | 455/524 |
| 7,203,161 B2 * | 4/2007 | Beer et al. | ...................... | 370/224 |
| 7,302,615 B2 * | 11/2007 | Sakai | ............................. | 370/222 |
| 2001/0014956 A1 * | 8/2001 | Nagata et al. | ..................... | 714/8 |
| 2002/0191537 A1 * | 12/2002 | Suenaga | ........................ | 370/221 |
| 2004/0202111 A1 * | 10/2004 | Beshai et al. | ................. | 370/237 |
| 2006/0268684 A1 * | 11/2006 | Cohn | ............................. | 370/216 |
| 2007/0053285 A1 | 3/2007 | Beer et al. | ..................... | 370/222 |

\* cited by examiner

*Primary Examiner* — Ricky Ngo
*Assistant Examiner* — Phuongchau B Nguyen
(74) *Attorney, Agent, or Firm* — Harrington & Smith

(57) ABSTRACT

A method and apparatus in accordance with the present invention provides monitoring a self-adjusting multi-tier processing system. At least one computing resource of one of the tiers of the self-adjusting multi-tier processing system is dynamically bypassed based on at least one predetermined criterion, wherein dynamically bypassing energizes or de-energizes a bypass control switch that operates to route data between tiers of the system in a manner that excludes the at least one computing resource.

15 Claims, 7 Drawing Sheets

NETWORK ELEMENT BYPASS IN COMPUTING COMPUTER ARCHITECTURE

TECHNICAL FIELD

The teachings in accordance with the exemplary embodiments of this invention relate generally to a multi-tier processing system and, more specifically, relate to methods and apparatus for operating such a system.

BACKGROUND

Some modern computing computer architectures rely on a multi-tiered environment. A load balancer or proxy might dispatch work to a server in the tier above it. Under high load conditions additional dispatchers and servers might be automatically provisioned via software so that the dispatchers can handle a queue of incoming work requests. In another scenario a server might be experiencing high CPU load and a network appliance might be provisioned to intercept requests from the network to accelerate encryption/decryption of a network packet.

A problem that arises is that under low load conditions the additional dispatchers, servers and network appliances sit idle. This can result in wasted power consumption, an underutilized network and a deterioration of network efficiency. The same is the case for a high load condition as well as in an occurrence of a hardware failure.

Another problem that arises in a multi-tier processing system occurs when one tier of the multi-tier processing system becomes unavailable, as this condition can limit the accessibility of other tiers.

Of relevance to these teachings is co-owned US Patent Publication No. 2007/0053285 A1, directed to recovering faults in a token ring network in which a command is sent at regular intervals to a control device. A control device re-starts its timer upon receipt of a command, and bypasses all of the ports under its control if another command is not received prior to expiration of that timer (e.g., double the regular interval period).

SUMMARY

In one exemplary embodiment of this invention there is provided a computer readable memory storing a program of instructions that when executed by a processor result in actions comprising: monitoring a state of a self-adjusting multi-tier computer processing system; comparing the state of the self-adjusting multi-tier computer processing system to at least one predetermined criterion; and in response to the comparing, dynamically bypassing at least one computing resource within one of the tiers of the self-adjusting multi-tier processing system by energizing or de-energizing at least one switch so as to route data between tiers of the system in a manner that excludes the at least one computing resource.

In another exemplary embodiment of this invention there is provided a computer-implemented method comprising: monitoring a state of a self-adjusting multi-tier computer processing system; comparing the monitored state of the self-adjusting multi-tier computer processing system to at least one predetermined criterion; and in response to the comparing, dynamically bypassing at least one computing resource within one of the tiers of the self-adjusting multi-tier processing system by energizing or de-energizing at least one switch so as to route data between tiers of the system in a manner that excludes the at least one computing resource.

In still another exemplary embodiment of this invention there is provided an apparatus which comprises a monitoring device, a memory and a processor. The monitoring device is configured to monitor a state of a self-adjusting multi-tier computer processing system. The memory stores at least one predetermined criterion. The processor is configured to compare the monitored state of the self-adjusting multi-tier computer processing system to the at least one predetermined criterion stored in the memory, and to dynamically bypass at least one computing resource within one of the tiers of the self-adjusting multi-tier computer processing system when data is routed between tiers by energizing or de-energizing at least one switch within the self-adjusting multi-tier computer processing system based on the comparing.

BRIEF DESCRIPTION OF THE DRAWINGS

The foregoing and other aspects of the teachings of this invention are made more evident in the following Detailed Description, when read in conjunction with the attached Drawing Figures, wherein:

FIG. 3a is another diagram illustrating an exemplary embodiment of the multi-tier processing system during a low load condition.

FIG. 4a is another diagram illustrating an exemplary embodiment of the multi-tier processing system during a high load condition.

DETAILED DESCRIPTION

The exemplary embodiments described herein may be generally directed to a program storage device readable by a machine, tangibly embodying a program of instructions executable by the machine for performing operations.

There is a need for an intelligent device for a point-to-point or multi-drop network configured to bypass network elements using predetermined criterion based on, for example, energy conservation, load balancing, efficient network utilization and performance management. Therefore, there is a need for a method and an apparatus for dynamically bypassing at least one tier of a multi-tier processing system. A multi-drop network is characterized in that intelligence is distributed among more than a single node or tier, and these tiers communicate with one another and/or with another network or a higher node over a common bus or pathway. A point to point network is characterized in different nodes, at the same tier or at different tiers, use independent communication pathways to exchange information with a common node at a different tier.

Figure 1:
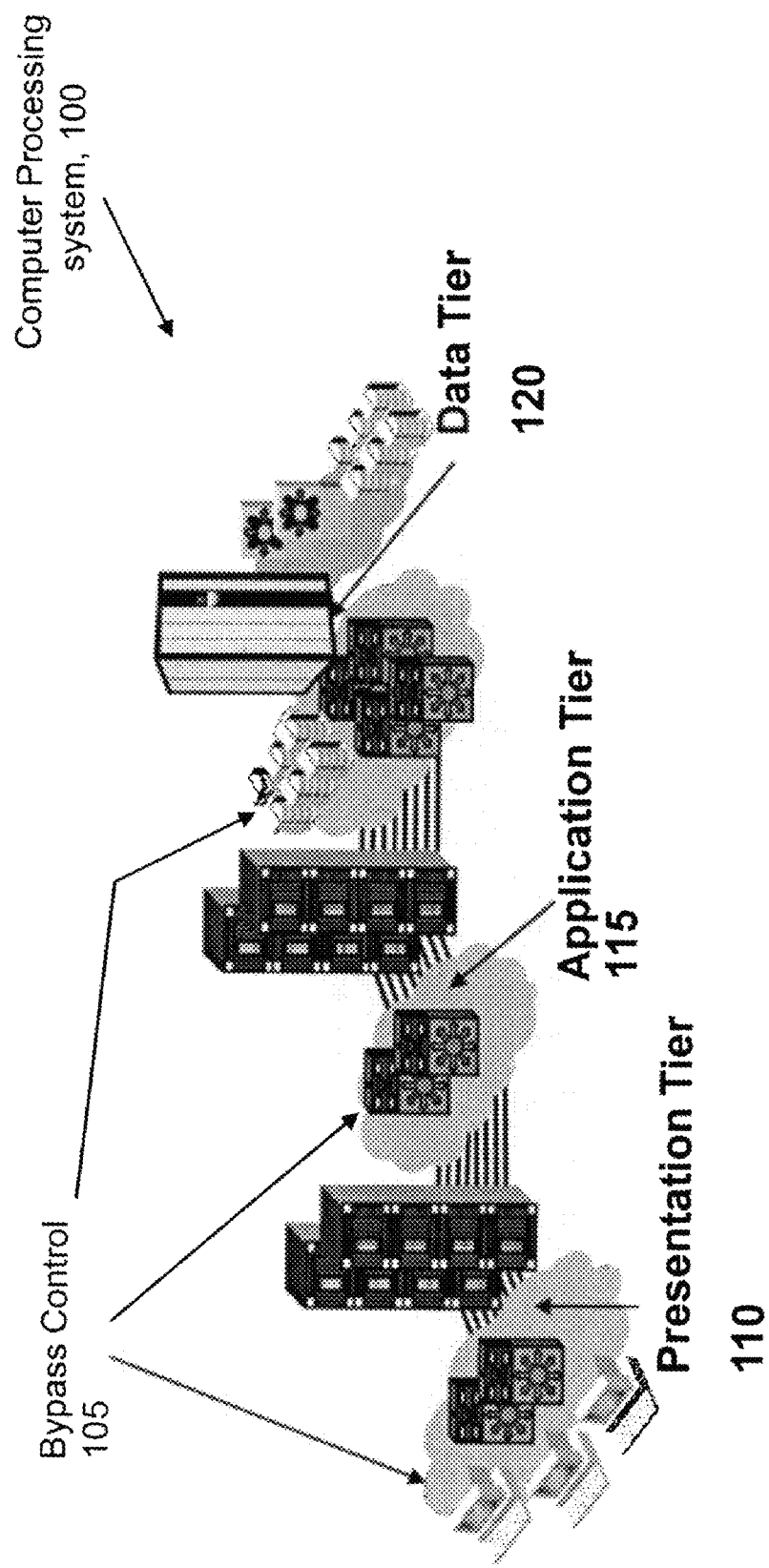
FIG. 1 is diagram illustrating a system incorporating at least one multi-tier processing system.

Referring to FIG. 1, a diagram is shown for illustrating a system incorporating a multi-tier processing system 100 or network. At least one bypass control 105 is coupled with the multi-tier processing system 100. Each tier of the system 100 is made up of at least one network element, such as for example network appliances or network dispatchers. The multi-tier processing system 100 includes a presentation tier 110 which includes for example a graphical user interface (typically multiple graphical user interfaces as illustrated by the three monitors of FIG. 1), an application tier 115, and a data tier 120 which includes for example databases, but is not limited to only three tiers. For example, other multi-tier systems may have multiple database tiers, and/or multiple application tiers, as well as other tiers above or below the database tier such as an acceleration tier. These teachings can be used to bypass any one individual tier or multiple tiers.

Figure 7:
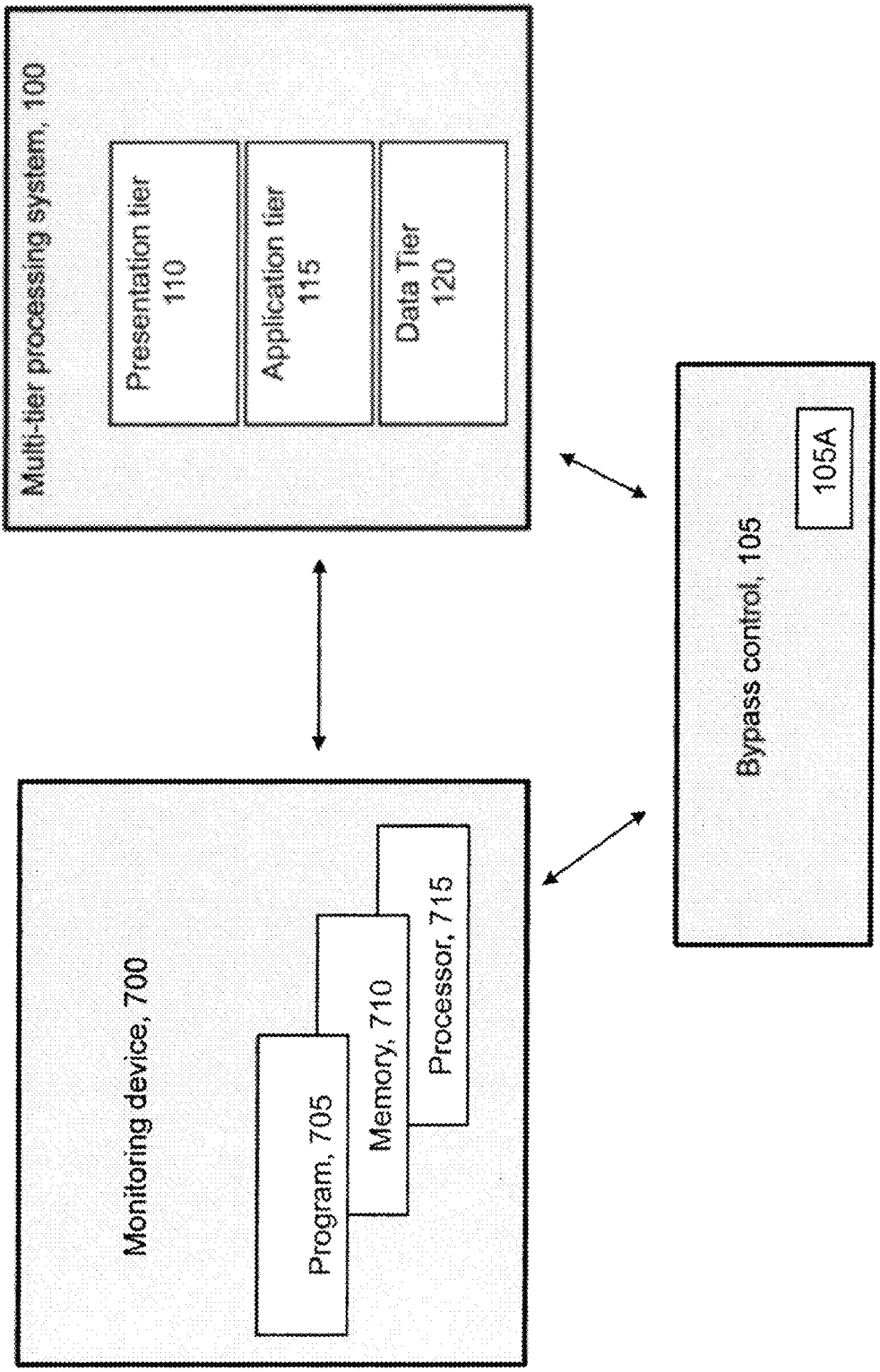
FIG. 7 is a diagram illustrating one non-limiting example of an apparatus in accordance with the exemplary embodiments of this invention.

The system 100 is self-adjusting in that it adapts itself (or is adapted by a monitoring device 700 that may or may not be external to the system 100, see FIG. 7) according to the processing task at hand to operate with all or with fewer than all of the multiple tiers that make up the whole system. As in the non-limiting example above for the system 100 with three tiers 110, 115, 120, each tier is configured to perform specific sub-sections or sub-processes of an overall processing task that the system performs. The tiers are hierarchically arranged, and in the specific example of FIG. 1 the presentation tier 110 is the lowest, the data tier 120 is the highest, and the application tier 115 is an intermediate tier that lies between the other two in the hierarchical arrangement. The hierarchical arrangement is a logical one relevant to processing that the system 100 performs, so the physical disposition of tiers relative to each other does not determine the hierarchical arrangement.

By example and not by way of limitation, the presentation tier or layer 110 has graphics displays and associated tools for the user interface to the entire system 100. The application tier or layer 115 contains network elements such as a network appliance or workload balancer and applications servers that execute the logic for domain specific applications. Finally, the data tier or layer 120 contains data for all of the data stored in the system.

Each tier, or network element of the multi-tier processing system 100, is connected to at least one upstream network element and at least one downstream network element. Exceptions lie at the ends of the non-ring system 100; for example there is no downstream tier to the presentation tier 110 since that tier has the user terminals or other end-user equipment. A similar truncation may lie at the highest tier of the system. At FIG. 1 the upstream data tier 120 is upstream to the application tier 115 and the presentation tier 110 is downstream to the application tier 115 and the three are connected in a hierarchical (non-ring) arrangement. The exemplary embodiments below detail bypass of the application tier 115, although any tier having a downstream tier and an upstream tier may incorporate a bypass according to these teachings. For example, the data tier 120 may be also coupled to a further upstream network element, not shown at FIG. 1. Also according to these teachings the highest or lowest tier in the hierarchy may be bypassed. For example, the presentation tier 110 may be bypassed so that the packet from the intermediate application tier 115 is not delivered to the presentation tier 110. This is advantageous when, for example, the presentation tier 110 is overloaded (e.g., exceeding some policy threshold such as data rate). Packet delivery to that tier 110 is temporarily suspended by means of the bypass control 105 until the policy condition is again satisfied.

The bypass control 105 may be disposed within the hardware/network element of a tier in which case the bypassing of the affected tier is functional rather than physical, or it may be disposed so that data routing after bypass avoids the network element(s) of a particular tier both functionally and physically.

The multi-tier processing system 100 may be monitored based on at least one predetermined criterion for dynamically bypassing at least one tier of the multi-tier processing system 100, as described in greater detail below. These criteria may derive from policies, or may be specifically stipulated by policies, which are implemented at least in part by operation of the bypass control 105. Exemplary and non-limiting policies include performance management policies and energy conservation policies. It is clear then that the criterion is compared against a current state of the system to determine whether or not to execute bypass of a particular tier. Because such comparing is continuous or repetitive, the bypass function is dynamic in the system 100.

Figure 2:
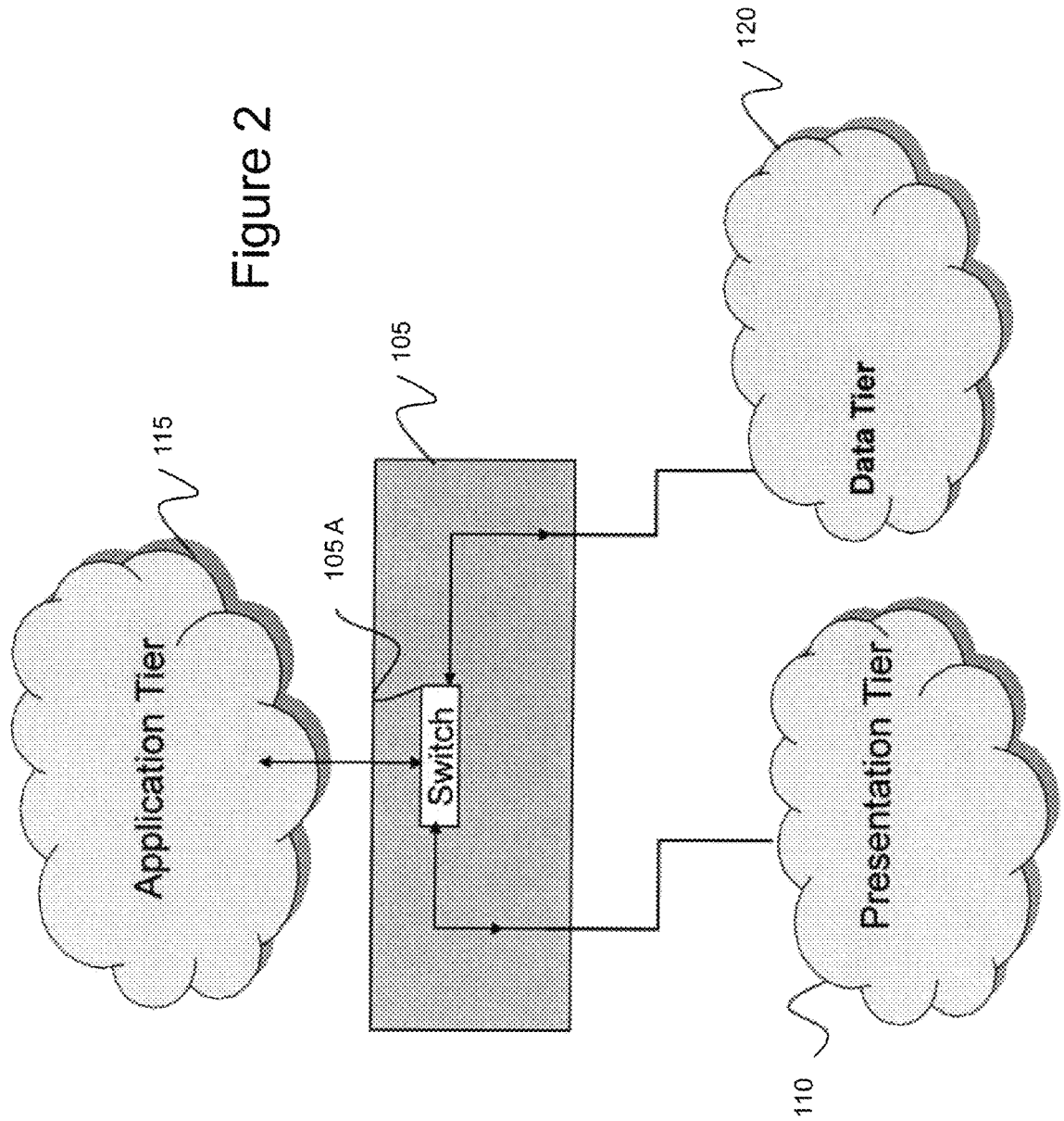
FIG. 2 is diagram illustrating an exemplary embodiment of a multi-tier processing system.

Referring to FIG. 2, there is shown a diagram illustrating an exemplary embodiment of a multi-tier processing system 100. The operation of the bypass control 105 is based on at least one predetermined criterion. The at least one predetermined criterion may include, but is not limited to, load balancing, power consumption, processing efficiency and/or efficient network utilization. The at least one predetermined criterion may include a default mode of operation to connect critical computing resources in the network 100. The bypass control 105 includes a switch 105A as shown in FIG. 2. The switch 105A includes, but is not limited to a soft switch, a hardware switch, a virtual switch, a network dispatcher, a router, a network switch, a network bridge, a multiplexer, and/or a de-multiplexer. The switch 105A may use a relay to energize or de-energize the at least one tier of the multi-tier processing system 100. The bypass control 105 may be used based on the at least one predetermined criterion to dynamically bypass the at last one tier of the multi-tier processing system 100. Dynamically bypassing may include energizing or de-energizing and routing at least a part of a network 100 to or around the at least one tier. The network 100 includes at least one upstream network and at least one downstream network connected to the multi-tier processing system 100.

The at least one tier of the multi-tier processing system 100, such as the presentation tier 110, the application tier 115 and the data tier 120 are configured to the bypass control 105. A logical connection is established with the presentation tier 110, the application tier 115, the data tier 120 and the switch 105A. The switch 105A dynamically bypasses the at least one tier of the multi-tier processing system 100. The switch 105A may route data packets associated with any specific processing tasks around or to the at least one tier of the multi-processing system 100, based on whether the switch is energized/flipped or not. The switch 105A may include a combination of an electro-mechanical switch, a software or virtual switch, and may include an electro-mechanical relay switch or a Complementary Metal-Oxide-Semiconductor (CMOS) switch. The switch 105A may be based on a solid state switch or on any other type of switch technology, including optical switches.

The CMOS switch has low static power consumption and does not produce as much heat as other forms of logic circuitry, for example transistor-transistor logic (TTL) or NMOS logic. The CMOS switch allows a high density of logic functions on a chip or a microprocessor. A depletion mode CMOS switch can be energized or de-energized based on the at least one predetermined criterion. One of ordinary skill in the art will understand that any multiplicity of switches can be used to energize or de-energize the at least one tier of the multi-tier processing system 100.

Figure 3:
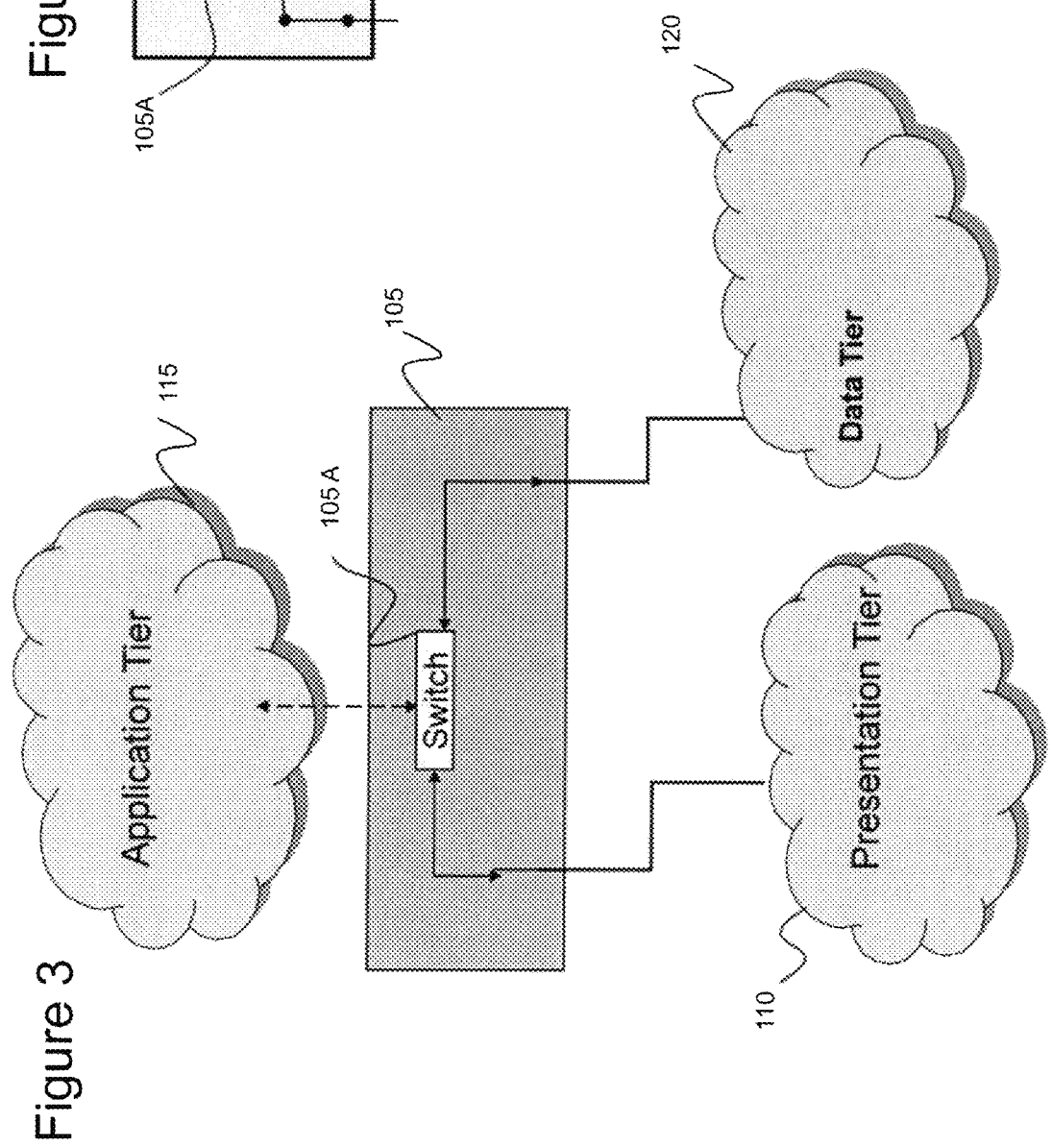
FIG. 3 is a diagram illustrating an exemplary embodiment of the multi-tier processing system during a low load condition.

FIG. 3 shows a diagram illustrating an exemplary embodiment of the multi-tier processing system 100 during a low load condition where the at least one predetermined criterion may be assumed to include the low load condition. During the low load condition in the network 100, processes such as the at least one tier of the multi-tier processing system 100, a dispatcher, a server, and/or a network appliance may be idle and the power consumption may be unregulated. During the low load condition, the processing of data is performed by the data tier 120 and not by the application tier 115. The data tier 120 has enough available processing power to support the presentation tier 110. The switch 105A may de-energize or bypass the application tier 115 using the relay.

In an exemplary embodiment the network element bypass control 105 is implemented by provisioning software that enables the bypass relay to be energized, thereby bringing the affected tier online to the system 100. Once the load on the software is reduced to a given level, the predetermined criterion, the provisioning software then de-energizes the bypass relay (either directly or via a control message to another control entity such as a processor acting as switch actuator), thus removing the tier functionally from the tiered network 100.

FIG. 3a illustrates the switch 105A in the position to physically and/or logically disconnect the application tier 115, such as for example due to the low load condition. Data packets then pass directly from the data tier 120 to the presentation tier 110, and vice versa. FIG. 3a shows the switch 105A in an open circuit position making the flow of data not possible to the application tier 115. The open circuit position can be controlled by software or by hardware or by a combination of both.

In another embodiment of the invention, the switch 105A may bypass a tier for both an under utilized network and/or for an over utilized network for the at least one predetermined condition. That is, in a first state of the system 100 (the system or network state is less than a predetermined load threshold, which is an under-utilized condition) the bypass opens to remove the application tier 115 from the system 100; and a second state of the system 100 (the system or network state is more than a predetermined load threshold, which is an over-utilized condition) the bypass closes to add the application tier 115 functionality back to the system 100. Instead, two different thresholds may be employed for utilization to avoid a ping-pong effect when the system state is near the threshold. There may be two or more predetermined criteria which must be met before the bypass is actuated in either taking an affected tier offline or returning it to the system 100.

Figure 4:
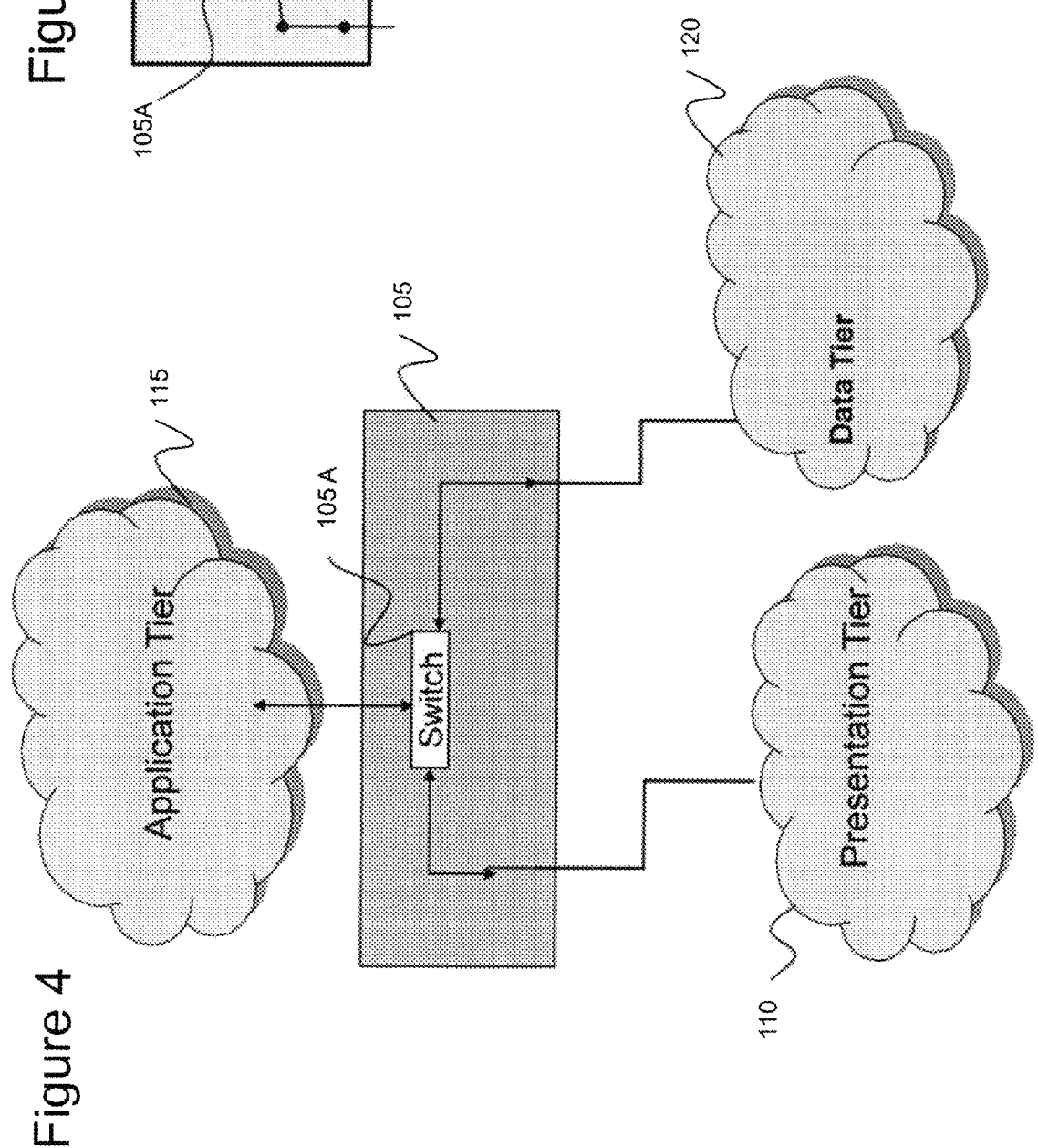
FIG. 4 is a diagram illustrating an exemplary embodiment of the multi-tier processing system during a high load condition.

FIG. 4 shows a diagram illustrating an exemplary embodiment of the multi-tier processing system 100 during a high load condition, and where the at least one predetermined criterion may be assumed to include the high load condition. During the high load condition in the network 100, processes such as the affected tier (or tiers) of the multi-tier processing system 100 (e.g., a dispatcher, a server, and/or a network appliance) may be overloaded with data and the power consumption may be unregulated.

As shown in the FIG. 4a during high load condition the switch 105A may physically or logically connect and route the data to the application tier 115. FIG. 4a shows the switch 105A in a closed circuit position making the flow of data between the presentation tier 110 and the data tier 120 possible only via the application tier 115. The closed circuit position can be controlled by software or by hardware or by a combination of both. Therefore, the data tier 120 and the application tier 115 have adequate resources to maintain optimal system performance. In a high load condition, the presentation tier 110, the application tier 115 and data tier 120, operates with optimum utilization.

In another exemplary embodiment of this invention, at least one tier (e.g., the application tier 115) may be added to the network 100 when needed to maintain an optimum network utilization.

Figure 5:
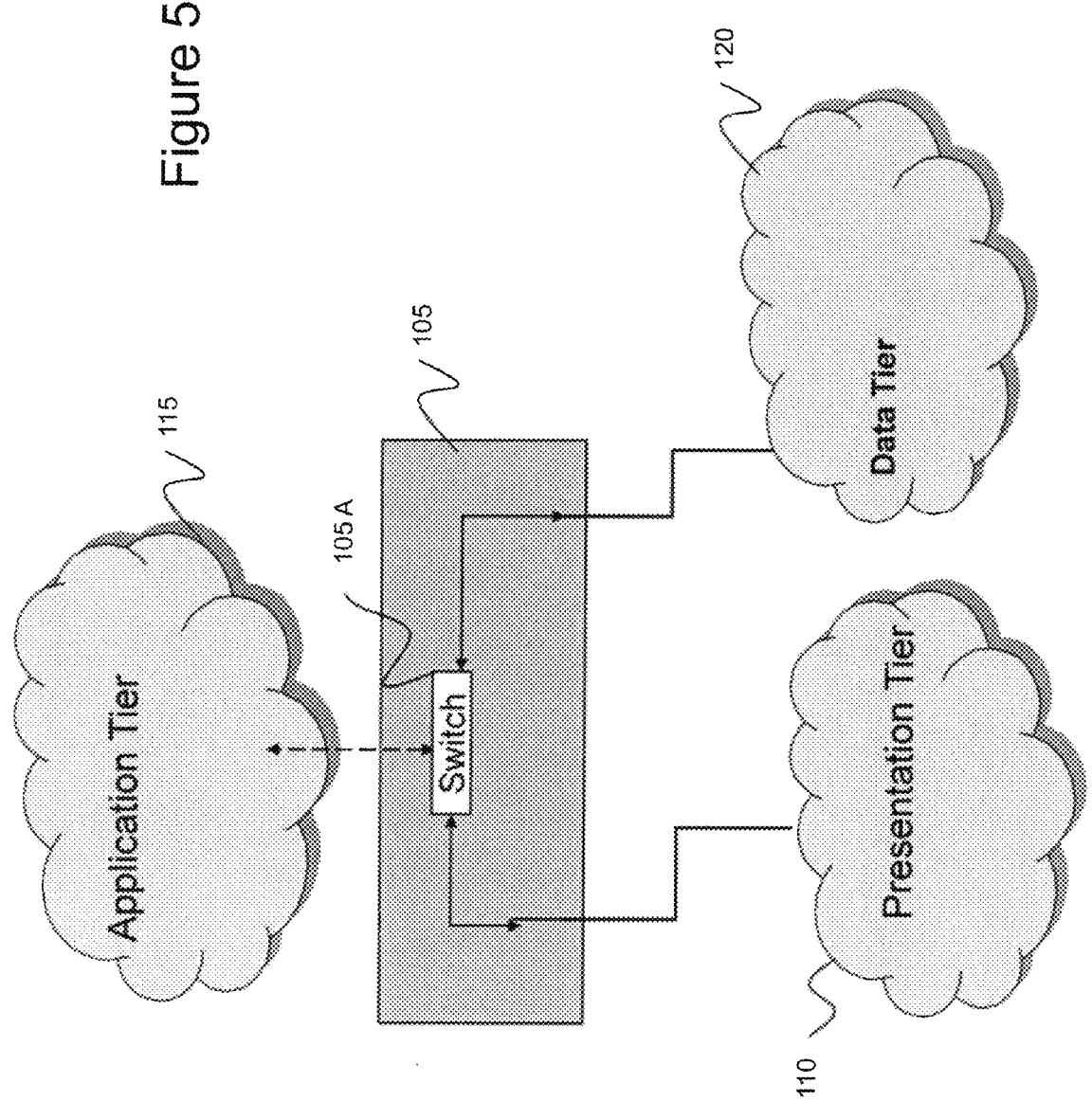
FIG. 5 is a diagram illustrating an exemplary embodiment of the multi-tier processing system during a hardware failure.

FIG. 5 shows a diagram illustrating an exemplary embodiment of the multi-tier processing system 100 during a hardware failure, and where the at least one predetermined criterion may be assumed to include failure of a hardware component. During hardware failure, such as power failure, system shutdown, malfunctions of hardware and/or software, by using the bypass control 105 the data packets can be made to flow from the presentation tier 110 to the data tier 120 and vice versa, bypassing the application tier 115 as illustrated in FIG. 5. For example, as shown in FIG. 3a, the switch 105A bypasses the application tier 115, and the data flows directly from the data tier 120 to the presentation tier 110 and vice versa.

Figure 6:
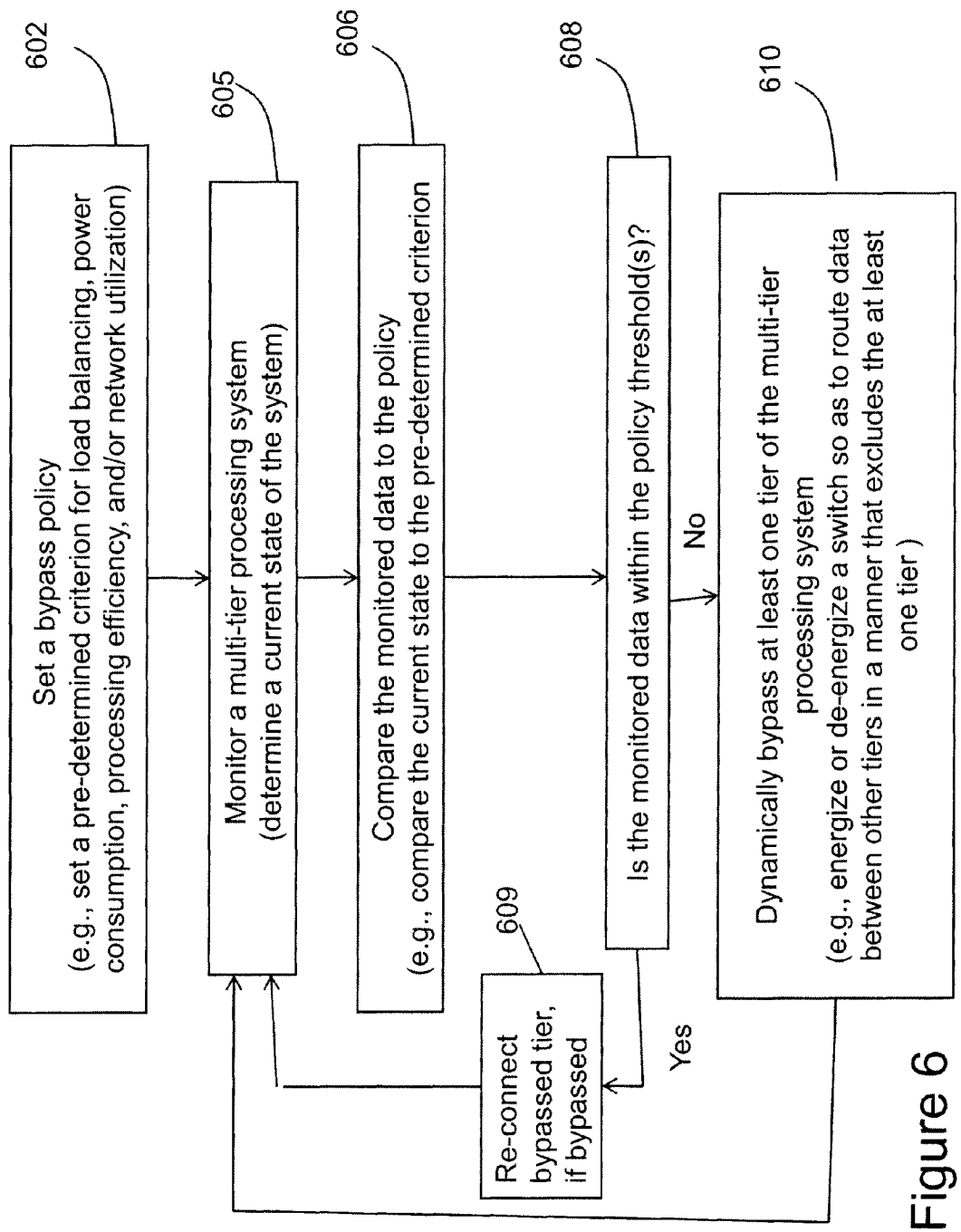
FIG. 6 is a flowchart illustrating one non-limiting example of a method in accordance with the exemplary embodiments of this invention.

FIG. 6 shows a flowchart illustrating one non-limiting example of a method in accordance with the exemplary embodiments of this invention. At block 602 the policy is set, which in exemplary embodiments is storing in the memory one or more predetermined criterion or thresholds at which a tier is functionally bypassed and re-connected to other tiers. As above, the pre-determined criteria may be load balancing, power consumption, processing efficiency, or network utilization. More than one criterion may be used, and there may be different thresholds or criteria for bypassing versus re-connecting the same tier. At block 605 the multi-tier processing system 100 is monitored and the data is stored in a memory, at least temporarily (e.g., a particular state of the system is determined and stored, such as hardware operation, hardware power, data throughput, etc). At block 606 the monitored data is compared to the policy, or more particularly the current state of the system is compared to the pre-determined criterion.

Block 608 questions whether the monitored data is within the policy thresholds. If the result from block 606 is within the allowable thresholds set by the policy of block 602, then the method proceeds to block 609 at which a bypassed tier is re-connected to the system functionally and the system is monitored again at block 605. If the result from block 606 is instead outside the allowable thresholds set by the policy of block 602, then the method proceeds to block 610 at which a tier of the system is bypassed. Then the monitoring at block 605 repeats, but in this instance the state of the system with the bypassed tier (bypassed at block 610) is determined. If the subsequent comparison at block 606 results at block 608 that the state of the system with the bypassed tier is now within the threshold of the bypass policy (e.g., the system with the bypassed tier is no longer balanced), then block 608 leads to block 609 where the bypassed tier is re-connected and the state of the system with the re-connected tier is again monitors at block 605. If no tier is bypassed then no action is taken at block 609. In an embodiment, either or both of the bypassing at block 610 and the re-connecting at block 609 may be implemented by energizing or de-energizing a switch/bypass control 105 which routes a part of the network 100 through or around the at least one tier. While FIG. 6 is detailed with reference to bypassing an entire tier, in an embodiment the bypass can as well be of only a particular computing resource within a particular tier rather than the entire tier itself.

FIG. 7 is shown a diagram illustrating one non-limiting example of an apparatus in accordance with the exemplary embodiments of this invention. A monitoring device 700 may include a program 705 stored in a memory 710 and a processor 715. The monitoring device 700 may be configured to monitor operations of the multi-tier processing system 100. The bypass control 105 may be coupled with the monitoring device 700 and the multi-tier processing system 100 for dynamically bypassing at least one tier of the multi-tier processing system 100 based on at least one predetermined criterion. The bypass control 105 may optimize network-bridging capability for at least one tier of the multi-tier processing system 100.

In another exemplary embodiment of this invention, the at least one tier of the multi-tier processing system 100 or the bypass control 105 may be controlled locally or remotely.

In another exemplary embodiment of this invention, the monitoring device 700 and the bypass control 105 may be a single unit, and the monitoring device 700 may lie within one of the tiers over which it exerts bypass control. The monitoring device 700 is shown separately from the processing system 100 in FIG. 7 but for embodiments in which they are not physically distinct the program 705 may be within a memory of one or more tiers 110, 115, 120 of the system 100, and/or the processor which executes that program 705 may be in a tier. In such embodiments both the memory and the processor are arranged so as to remain operational for the bypassing function regardless of any tier that may be bypassed according to the above teachings so as to enable dynamic operation as noted above.

In an exemplary embodiment the monitoring device 700 is configured to monitor a state of a multi-tier computer processing system, the memory 710 stores at least one predetermined criterion; and the processor 715 is configured to compare the monitored state to the stored at least one predetermined criterion, and to dynamically bypass at least one computing resource (e.g., any of the hardware computing elements noted above) within one of the tiers 115 of the multi-tier computer processing system 100 when data is routed between tiers 110, 120 by energizing or de-energizing at least one switch 105, 105a within the multi-tier computer processing system based on the comparing.

In various other exemplary embodiments: the switch 105, 105a is disposed so as to route data packets which are associated with a specific processing task to bypass the at least one computing resource (e.g., in tier 115); the switch (one or more of them) is disposed so as to bypass all computing resources within the said one tier; and the processor 715 is remote from the switch 105, 105a.

In other embodiments which may also incorporate some or all of those various exemplary embodiments above, the switch comprises a plurality of dynamic bypass switches each associated with an individual computing resource within the subject tier 115, and the plurality of dynamic bypass switches are set in dependence on the comparing at the processor 715 to meet the predetermined criterion.

In a further variation the memory 710 stores a plurality of predetermined criteria and the monitoring device 700 is configured to monitor a plurality of system metrics of the multi-tier computing system 100. In this embodiment the processor is configured to dynamically bypass the plurality of computing resources so as to achieve a performance at the system 100 that is optimized across the plurality of predetermined criteria by trading off one of the metrics versus another of the metrics.

As noted above, in an exemplary embodiment there is a default mode for the switch 105, 105a which is automatically set in the event power is removed from at least a portion of the multi-tier computer processing system 100.

Various implementations of the computing resource that is dynamically bypassed include a homogenous or general purpose computing element, but another implementation of the resource is a function accelerator which is configured to speed up a specific task or process that is itself executed/completed by a different resource in the system 100.

The exemplary embodiments of the invention, as discussed above and as particularly described with respect to exemplary methods, may be implemented in conjunction with a program storage device (e.g., at least one memory) readable by a machine, tangibly embodying a program of instructions (e.g., a program or computer program) executable by the machine for performing operations. The operations comprise steps of utilizing the exemplary embodiments or steps of the method.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Generally, various exemplary embodiments of the invention can be implemented in different mediums, such as software, hardware, logic, special purpose circuits or any combination thereof. As a non-limiting example, some aspects may be implemented in software that may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A non-transitory computer readable memory storing a program of instructions that when executed by a processor result in actions comprising:
    monitoring a state of a self-adjusting multi-tier computer processing system;
    comparing the state of the self-adjusting multi-tier computer processing system to at least one predetermined criterion; and
    in response to the comparing, dynamically bypassing at least one computing resource within one of the tiers of the self-adjusting multi-tier processing system by energizing or de-energizing at least one switch so as to route data between tiers of the system in a manner that excludes the at least one computing resource, wherein the self-adjusting multi-tier processing system comprises a multiplicity of tiers arranged hierarchically relative to one another, each tier performing one or more specific sub-sections of an overall processing task performed by the system;

in which the said one of the tiers which has the at least one computing resource that is bypassed is an intermediate tier which is neither highest nor lowest in the hierarchical arrangement of tiers.

2. The non-transitory computer readable memory according to claim 1, wherein each tier of the self-adjusting multi-tier computer processing system comprises a plurality of computing resources, and wherein dynamically bypassing comprises bypassing all computing resources within the at least one tier.

3. The non-transitory computer readable memory according to claim 1, wherein the at least one predetermined criterion comprises at least one of: load balancing; power consumption; processing efficiency and efficient network utilization; and further wherein there is a default mode for the at least one switch which is automatically set in the event power is removed from at least a portion of the system.

4. A computer-implemented method comprising:
monitoring a state of a self-adjusting multi-tier computer processing system;
comparing the monitored state of the self-adjusting multi-tier computer processing system to at least one predetermined criterion; and
in response to the comparing, dynamically bypassing at least one computing resource within one of the tiers of the self-adjusting multi-tier processing system by energizing or de-energizing at least one switch so as to route data between tiers of the system in a manner that excludes the at least one computing resource, wherein the switch comprises a plurality of dynamic bypass switches each associated with an individual computing element within the said one of the tiers, and wherein the plurality of dynamic bypass switches are set in dependence on the comparing to meet the predetermined criterion, wherein monitoring the state of the self-adjusting multi-tier processing system comprises monitoring power consumption across the system, and wherein the predetermined criterion comprises a power consumption target.

5. The computer-implemented method according to claim 4, wherein monitoring the state of the self-adjusting multi-tier processing system comprises monitoring a data flow in or around the self-adjusting multi-tier processing system, and the predetermined criterion comprises at least one of a system performance target or a bandwidth utilization target.

6. The computer-implemented method according to claim 4, wherein dynamically bypassing comprises bypassing all computing resources within the said one tier.

7. The computer-implemented method according to claim 4, wherein there is a default mode for the at least one switch which is automatically set in the event power is removed from at least a portion of the system.

8. A computer-implemented method comprising:
monitoring a state of a self-adjusting multi-tier computer processing system;
comparing the monitored state of the self-adjusting multi-tier computer processing system to at least one predetermined criterion; and
in response to the comparing, dynamically bypassing at least one computing resource within one of the tiers of the self-adjusting multi-tier processing system by energizing or de-energizing at least one switch so as to route data between tiers of the system in a manner that excludes the at least one computing resource, wherein the switch comprises a plurality of dynamic bypass switches each associated with an individual computing element within the said one of the tiers, and wherein the plurality of dynamic bypass switches are set in dependence on the comparing to meet the predetermined criterion, wherein there are a plurality of predetermined criteria and monitoring the state of the self-adjusting multi-tier computer processing system comprises monitoring a plurality of system metrics, and wherein dynamically bypassing comprises actuating selected ones of the plurality of switches so as to achieve a system performance optimized across the plurality of predetermined criteria by trading off one of the metrics versus another of the metrics.

9. An apparatus comprising:
a monitoring device configured to monitor a state of a self-adjusting multi-tier computer processing system;
a memory storing at least one predetermined criterion;
a processor configured to compare the monitored state of the self-adjusting multi-tier computer processing system to the stored at least one predetermined criterion, and to dynamically bypass at least one computing resource within one of the tiers of the self-adjusting multi-tier computer processing system when data is routed between tiers by energizing or de-energizing at least one switch within the self-adjusting multi-tier computer processing system based on the comparing, wherein the switch comprises a plurality of dynamic bypass switches each associated with an individual computing resource within the said one of the tiers, and wherein the plurality of dynamic bypass switches are set in dependence on the comparing to meet the predetermined criterion; and
a processor is configured to dynamically bypass a plurality of computing resources of the self-adjusting multi-tier computer processing system when data is routed between tiers by energizing or de-energizing a plurality of switches based on the comparing, wherein the memory stores a plurality of predetermined criteria and the monitoring device is configured to monitor a plurality of system metrics of the self-adjusting multi-tier computing system, and wherein the processor is configured to dynamically bypass the plurality of computing resources so as to achieve a system performance that is optimized across the plurality of predetermined criteria by trading off one of the metrics versus another of the metrics.

10. The apparatus according to claim 9, wherein the at least one switch comprises at least one of: an electro-mechanical relay, a CMOS based solid state switch; a network dispatcher, a router, a network bridge, a multiplexer, a de-multiplexer and a virtual software switch.

11. The apparatus according to claim 9, wherein the at least one switch is disposed so as to route data packets which are associated with a specific processing task to bypass the at least one computing resource.

12. The apparatus according to claim 9, wherein the at least one switch is disposed so as to bypass all computing resources within the said one tier.

13. The apparatus according to claim 9, wherein processor is remote from the at least one switch.

14. The apparatus according to claim 9, wherein there is a default mode for the at least one switch which is automatically set in the event power is removed from at least a portion of the self-adjusting multi-tier computer processing system.

15. An apparatus comprising:
a monitoring device configured to monitor a state of a self-adjusting multi-tier computer processing system;
a memory storing at least one predetermined criterion;
a processor configured to compare the monitored state of the self-adjusting multi-tier computer processing system to the stored at least one predetermined criterion, and to dynamically bypass at least one computing resource within one of the tiers of the self-adjusting multi-tier computer processing system when data is routed between tiers by energizing or de-energizing at least one switch within the self-adjusting multi-tier computer processing system based on the comparing, in which the at least one computing resource comprises a function accelerator disposed within an application tier that is disposed between a presentation tier and a data tier, in which the function accelerator is configured to speed up a specific task or process.

* * * * *